(12) United States Patent
Ohara

(10) Patent No.: US 6,314,476 B1
(45) Date of Patent: Nov. 6, 2001

(54) NETWORK ADAPTER ENABLING BIDIRECTIONAL MONITORING OF A TERMINAL DEVICE BETWEEN A COMPUTER AND A MANAGING DEVICE

(75) Inventor: Kiyotaka Ohara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/257,504

(22) Filed: Feb. 25, 1999

(30) Foreign Application Priority Data

Feb. 26, 1998 (JP) .................................................. 10-064520

(51) Int. Cl.[7] ...................................................... G06F 3/00
(52) U.S. Cl. .................................. 710/15; 710/6; 710/18; 710/19; 709/202; 709/223; 709/224; 714/2; 714/25; 714/48
(58) Field of Search .................................. 710/6, 15, 18, 710/19; 714/2, 25, 48; 709/223, 224, 202

(56) References Cited

U.S. PATENT DOCUMENTS

| | | | |
|---|---|---|---|
| 5,958,010 | * | 9/1999 | Agarwal et al. ...................... 709/224 |
| 6,065,139 | * | 5/2000 | Mehta et al. ............................ 714/55 |
| 6,122,639 | * | 9/2000 | Babu et al. ........................... 707/103 |
| 6,125,390 | * | 9/2000 | Touboul ................................ 709/223 |
| 6,192,034 | * | 2/2001 | Hsieh et al. .......................... 370/241 |

* cited by examiner

*Primary Examiner*—Thomas Lee
*Assistant Examiner*—Tammara Peyton
(74) *Attorney, Agent, or Firm*—Oliff & Berridge, PLC (57) ABSTRACT

A network adapter and a terminal system capable of supplying various statuses of a terminal device to a manager device are presented. A CPU of a print server senses a powered-on status of a printer, sends a dedicated transmission command to the printer, and receives response data indicating a present status of the printer after a status change, from the printer. The CPU of the print server determines whether the received response data is a response to the dedicated transmission command or a response to a normal transmission command output by a personal computer. If the response data is a response to the normal transmission command, the CPU sends the response data to the personal computer. If the response data is a response to the dedicated transmission command, the CPU of the print server stores status data contained in the response data into a status information storing area of a RAM of the print server. Upon receiving from the manager device a general-purpose terminal status management command based on, for example, the SNMP, the CPU of the print server reads the status information from the status information storing area, and sends it to the manager device.

20 Claims, 6 Drawing Sheets

\<NORMAL TRANSMISSION COMMAND\>

@ABC USTATUS DEVICE=ON

Fig. 2B

\<DEDICATED TRANSMISSION COMMAND\>

@ABC USTATUS DEVICEEXT=ON

Fig. 2C

\<RESPONSE TO NORMAL TRANSMISSION COMMAND\>

@ABC USTATUS DEVICE
    CODE=*****
    DISPLAY="Cover Open"
    ONLINE=FALSE

Fig. 2D

\<RESPONSE TO DEDICATED TRANSMISSION COMMAND\>

@ABC USTATUS DEVICEEXT
    CODE=*****
    DISPLAY="Cover Open"
    ONLINE=FALSE

NETWORK ADAPTER ENABLING BIDIRECTIONAL MONITORING OF A TERMINAL DEVICE BETWEEN A COMPUTER AND A MANAGING DEVICE

BACKGROUND OF THE INVENTION

1. Field of Invention

The invention relates to a network adapter for connecting a terminal device, such as a printer or the like, to a network, and a terminal system that includes the network adapter and the terminal device.

2. Description of Related Art

If a plurality of terminal devices, such as computers, printers and the like, are to be connected to a network formed by, for example, a local area network (LAN), a telephone line or the like, a network adapter termed a print server is often used to connect the printers to the network.

Figure 5:
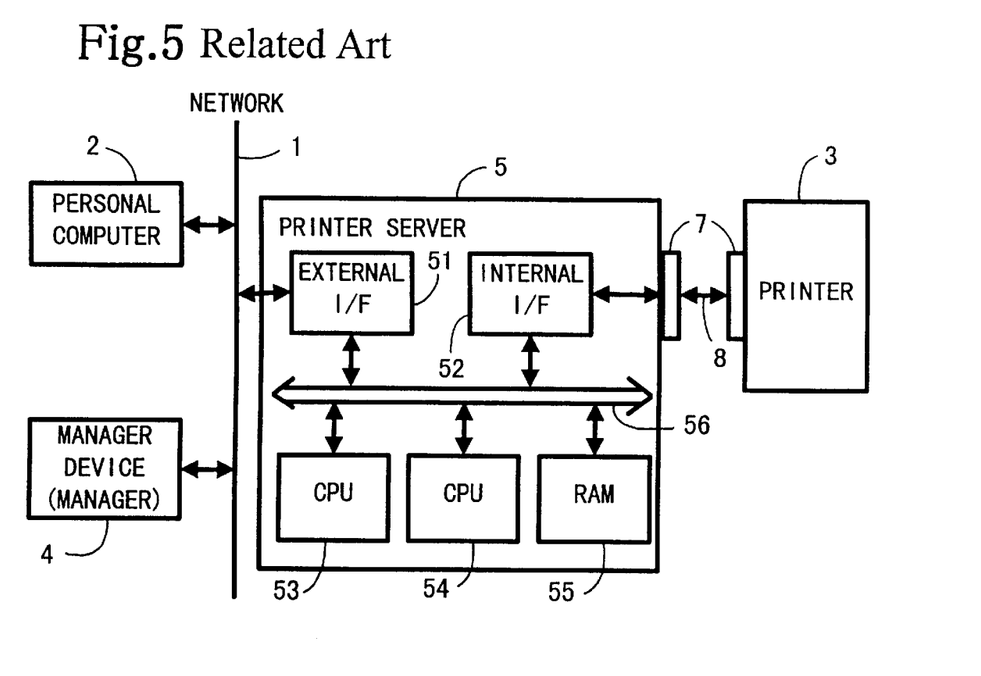
FIG. 5 is a block diagram illustrating a related-art technology.

FIG. 5 illustrates such a networked system construction including a network 1, a personal computer 2 connected to the network 1, a printer 3 provided as a terminal device, a manager device 4 connected to the network 1 for managing the printer 3, a print server 5 interconnecting the printer 3 and the network 1 so as to enable bidirectional communication between the printer 3 and the personal computer 2 and bidirectional communication between the printer 3 and the manager device 4.

Known as the print server 5 is, for example, a parallel interface based on the IEEE (acronym for Institute of Electrical and Electronics Engineers in USA) 1284. Signal lines of the IEEE 1284 interface and signal contents transmitted by the signal lines are exemplified in FIG. 6.

Figure 6:
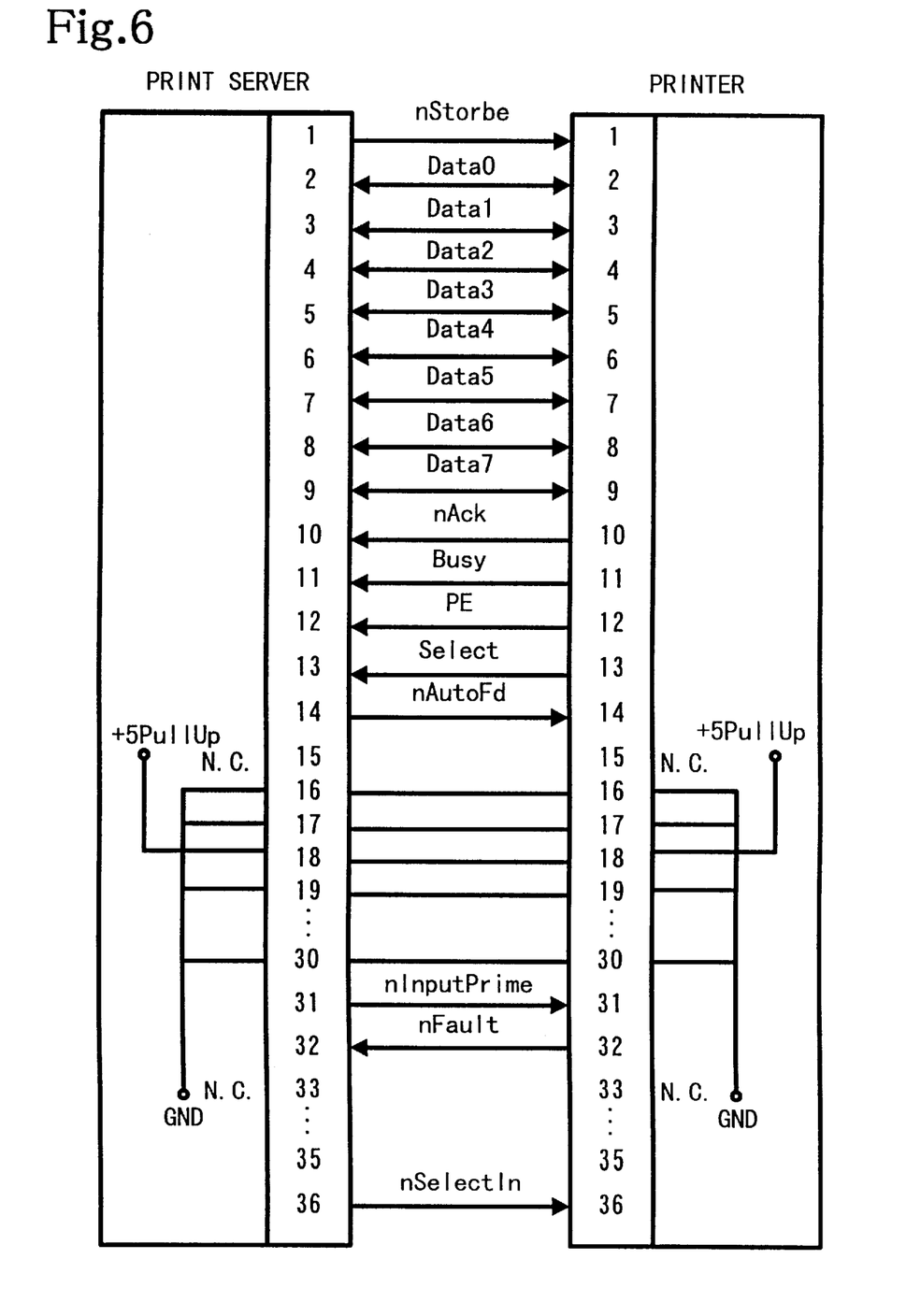
FIG. 6 illustrates an example of connection of a general-purpose data port.

In the diagram of FIG. 6, reference character n represents a negative logic added ahead of various signals, and nStrobe represents a signal that indicates start of data transmission from the personal computer 2 to the printer 3. Data0–Data7 represent data signals that are parallelly transmitted bidirectionally between the personal computer 2 and the printer 3 at a rate of 8 bits for each operation. Furthermore, nAck and Busy represent signals by which the printer 3 indicates the status thereof to the personal computer 2. For example, the nAck signal, when switched to a low level, indicates that the printer 3 has completed receiving data and is ready to receive next data. The Busy signal, when switched to a high level, indicates that the printer 3 is presently receiving data and unable to receive other data.

Further in FIG. 6, the PE signal indicates that no print paper is set, and the Select signal indicates that the printer 3 is selected. The nAutoFd signal indicates an automatic paper feed instruction (low level) from the personal computer 2 to the printer 3. The nInputPrime signal indicates an initialization instruction from the personal computer 2 to the printer 3. The nFault signal from the printer 3 to the personal computer 2 indicates a printer error. The nFault signal switches to a low level when the printer 3 detects absence of print paper, an off-line status or an error. The nSelectIn signal indicates a power-on instruction to the printer 3. The IEEE 1284 interface makes it possible to monitor the status of the printer 3 on the basis of levels of the various signals output from the printer 3 to the personal computer 2, such as, the Busy signal, the PE signal, the Select signal, and the nFault signal.

The signal lines for the above-mentioned signals are connected to the printer 3 and the print server 5 via connecting lines 8 as shown in FIG. 5. The connecting lines 8 have on opposite ends thereof connectors 7 each of which has predetermined pins 1–36 (see FIG. 6).

Although not shown in FIG. 5, the printer 3 has a CPU, a ROM, a RAM, a bus, an input interface (I/F), and an output interface (I/F), various sensors for detecting the status of various portions, and a printing unit.

The print server 5, as shown in FIG. 6, has an external interface (I/F) 51 for sending information to and receiving information from the personal computer 2 and the manager device 4 via the network 1, an internal interface (I/F) 52 for sending information to and receiving information from the printer 3, a CPU 53, a ROM 54 storing control programs needed to execute operations in response to various requests from the manager device 4, a RAM 55 for temporarily storing data, and a bus 56.

The manager device 4 is formed by a managing computer termed a manager. The manager device 4 is designed to receive from the print server 5 management information regarding a network appliance termed an agent, for example, the printer 3, and to monitor and manage the printer 3 (agent) according to the simple network management protocol (SNMP).

The manager device 4 (manager) has a CPU. Using the CPU, the manager device 4 generates a general-purpose terminal status management command based on the SNMP and sends the command to the print server 5 in order to manage the status of the printer 3, which is a network appliance. Upon receiving the terminal status management command, the print server 5 sends the status of the printer 3 indicated based on the levels of the various signals, for example, the Busy signal, the PE signal, the Select signal, the nFault signal, and the like, back to the manager device 4.

In the IEEE 1284 interface, the Busy signal, the PE signal, the Select signal and the nFault signal from the printer 3 are the only signals that are used to determine a status of the printer 3, so that the statuses of the printer 3 that can be monitored on the basis of the levels of these signals are limited, for example, to "ON-LINE", "OFF-LINE", "NO PRINT PAPER", "PRINTER ERROR", and the like. Therefore, with the IEEE 1284 interface, it is impossible to generate a piece of status information other than the aforementioned pieces of status information, for example, "COVER OPEN", from the aforementioned signals including the Busy signal, the PE signal and the like, in order to send it back to the manager device 4. Consequently, the IEEE 1284 interface makes it impossible to manage the detailed statuses of the printer 3 by using the general-purpose commands based on the SNMP from the manager device 4.

However, since the IEEE 1284 interface is bidirectional, the personal computer 2 is allowed to issue a transmission command in order to detect a detailed status of the printer 3, and the printer 3 is allowed to send response data in response to the command to the personal computer 2. More specifically, if the personal computer 2 issues the transmission command to detect a detailed status of the printer 3, the print server 5 forwards the command to the printer 3. In response to the transmission command, the printer 3 sends response data indicating a present detailed status thereof back to the personal computer 2. The transmission command from the personal computer 2 and the response data from the printer 3 are transmitted through the print server 5 without being subjected to any particular processing.

It may be considered that detailed statuses of the printer 3, such as "COVER OPEN" and the like, can be managed through the use of general-purpose commands from the manager device 4, by, for example, storing the response data output by the printer 3 in response to the transmission command from the personal computer 2, into a storage device provided in the print server 5, which is a network adapter, and reading out the response data from the storage device and sending it to the manager device 4 when the print server 5 receives a general-purpose terminal status management command based on the SNMP from the manager device 4.

However, the transmission command issued by the personal computer 2 can be turned off by a generally-termed off command. That is, in some cases, the personal computer 2 issues a transmission cancel command that cancels a transmission command that has been issued to detect a status of the printer 3. Once such a transmission cancel command is issued from the personal computer 2, the storage device of the print server 5 does not store any more response data indicating a detailed status of the printer 3. Therefore, the storage of the print server 5 does not necessarily have the latest status information regarding the printer 3. As a result, the present detailed status of the printer 3 cannot be reliably managed.

This problem is not unique to the IEEE 1284 interface, but may also arise in other types of parallel interfaces, or in serial interfaces, such as RS-232C, SCSI (small interface computer system interface) and the like, which do not allow a special or dedicated port to be set but must use a general-purpose data port to send and receive status information.

SUMMARY OF THE INVENTION

Accordingly, it is one aspect of the invention to provide a manager device in a network to be supplied with information regarding various statuses of a terminal device.

It is another aspect of the invention to provide a manager device in a network to be supplied with information regarding the status of a terminal device immediately after the terminal device starts operating in the network.

In accordance with one aspect of the present invention, there is provided a network adapter provided between a network and a terminal device, and interconnecting the network and the terminal device, that enables bidirectional communication between the terminal device and a computer connected to the network and bidirectional communication between the terminal device and a managing device connected to the network to manage the terminal device. The network adapter transfers to the terminal device a status request output by the computer to request that if the terminal device enters a predetermined status, the terminal device transmits status information indicating the predetermined status. The network adapter transfers the status information transmitted by the terminal device in response to the status request, to the computer.

The network adapter includes a status request generating device that generates and transmits the status request to the terminal device to request that if the status of the terminal device changes, the terminal device transmits the status information indicating a present status. The network adapter also includes a status information storage device that stores the status information from the terminal device. In addition, the network adapter includes a determining device that receives the status information transmitted by the terminal device in response to the status request, and determines whether the status information received is a response to the status request output by the computer or a response to the status request transmitted by the status request generating device. The determining device transmits the status information to the computer if the status information is the response to the status request output by the computer, and that transmits the status information to the status information storage device if the status information is the response to the status request transmitted by the status request generating device. The network adapter also includes a transmitting device that receives a terminal status management command that is output by the managing device to manage the status of the terminal device, reads the status information from the status information storage device, and transmits the status information to the managing device.

In this network adapter, the status request generating device generates a status request separately from a status request output by the computer, and transmits it to the terminal device. In response to the status request generated by the status request generating device, the terminal device transmits the status information to the network adapter every time the status of the terminal device changes. When the network adapter receives the status information from the terminal device, the determining device determines that the status information from the terminal device is a response to the status request transmitted to the terminal device from the status request generating device. Then, the status information is stored into the status information storage device.

Upon receiving the terminal status management command output by the managing device to manage the status of the terminal device, the transmitting device of the network adapter reads the status information from the status information storage device, and transmits the status information to the managing device.

Since the status request generating device generates the status request separately from the status request output by the computer and transmits it to the terminal device, the network adapter can receive the status information indicating the status of the terminal device every time the status of the terminal device changes, and can store the status information into the status information storage device. Therefore, the network adapter is able to supply various statuses of the terminal device to the managing device.

In the network adapter, the status information generated by the status request generating device may be distinguishable by the terminal device from the status request output by the computer.

Therefore, upon receiving the status request from the computer or the status request from the status request generating device, the terminal device can determine whether the received status request is from the computer or from the status request generating device. This makes it possible for the terminal device to transmit the status information in response to the status request in such a manner that it can be clearly determined which of the status requests the status information corresponds to. Consequently, it becomes possible for the determining device of the network adapter to easily determine whether the status information received by the determining device corresponds to the status request output by the computer or the status request output by the status request generating device.

The network adapter may further include a starting device that, when the terminal device is powered on, starts the status request generating device so as to generate the status request.

Since the starting device starts the status request generating device when the terminal device is powered on, the status request generating device outputs the status request immediately after the terminal device is powered on. Therefore, if the status of the terminal device later changes, the status information indicating the present status of the terminal device is reliably stored into the status information storage device, so that the status information is available to the managing device when necessary. Consequently, the network adapter becomes able to supply the status of the terminal device to the managing device immediately after the terminal device starts to operate on the network.

The terminal device may be an image forming device that forms an image based on image data, and the network adapter may receive the status information indicating a status of the image forming device from the image forming device, by using a general-purpose data port.

Therefore, once the status request generating device has transmitted the status request to the image forming device, that is, the terminal device, the image forming device transmits the status information indicating the present status thereof in response to the status request every time the status of the image forming device changes.

The status information output in response to the status request from the status request generating device does not merely indicate the status of the image forming device by a combination of particular levels of signals at the general-purpose data port as in the conventional art, but indicates a detailed status of the image forming device by predetermined codes and the like. Therefore, it becomes possible for the network adapter to supply detailed statuses of the image forming device to the managing device in response to general-purpose commands output by the managing device, such as SNMP-based commands, etc.

In accordance with another aspect of the invention, there is provided a terminal system including a terminal device and a network adapter provided between a network and a terminal device and interconnecting the network and the terminal device, wherein the network adapter enables bidirectional communication between the terminal device and a computer connected to the network and bidirectional communication between the terminal device and a managing device connected to the network to manage the terminal device. The network adapter may transfer to the terminal device a status request output by the computer to request that if the terminal device enters a predetermined status, the terminal device transmits status information indicating the predetermined status, and wherein the network adapter transfers the status information transmitted by the terminal device in response to the status request, to the computer. The network adapter includes a status request generating device that generates and transmits a status request to terminal device to request that if the status of the terminal device changes, the terminal device transmits the status information indicating a present status, a status information storage device that stores the status information from the terminal device, a determining device that receives the status information transmitted by the terminal device in response to the status request, determines whether the status information received is a response to the status request output by the computer or a response to the status request transmitted by the status request generating device, transmits the status information to the computer if the status information is the response to the status request output by the computer, and transmits the status information to the status information storage device if the status information is the response to the status request transmitted by the status request generating device, and a transmitting device that receives a terminal status management command that is output by the managing device to manage the status of the terminal device, reads the status information from the status information storage device, and transmits the status information to the managing device.

In this terminal system, the status request generating device of the network adapter generates the status request separately from the status request output by the computer, and transmits it to the terminal device. Therefore, every time the status of the terminal device changes, the status information indicating the present status is stored into the status information storage device of the network adapter.

As a result, when the managing device transmits to the network adapter the terminal status management command to manage the status of the terminal device, the transmitting device of the network adapter reads the status information from the status information storage device, and transmits it to the managing device. In this manner, it becomes possible to supply various statuses of the terminal device to the managing device.

In the terminal system, the status information generated by the status request generating device may be distinguishable by the terminal device from the status request output by the computer.

Therefore, upon receiving the status request from the computer or the status request from the status request generating device, the terminal device can determine whether the received status request is from the computer or from the status request generating device. This makes it possible for the terminal device to transmit the status information in response to the status request in such a manner that it can be clearly determined which of the status requests the status information corresponds to. Consequently, the determination regarding the status information by the determining device is facilitated.

In the terminal system, the network adapter may further include a starting device that, when the terminal device is powered on, starts the status request generating device so as to generate the status request.

Therefore, if the status of the terminal device changes after the terminal device is powered on, the status information indicating the present status of the terminal device is stored into the status information storage device of the network adapter, so that the status information is available to the managing device when necessary. In this manner, it becomes possible for the managing device to monitor changes in the status of the terminal device after the terminal device is powered on.

In the terminal system, the terminal device may be an image forming device that forms an image based on image data, and the network adapter may receive the status information indicating a status of the image forming device from the image forming device, by using a general-purpose data port.

Therefore, once the status request generating device of the network adapter has transmitted the status request to the image forming device, the image forming device transmits the status information indicating the present status thereof every time the status of the image forming device changes. Since the status information does not merely indicate the status of the image forming device by a combination of particular levels of signals at the general-purpose data port as in the conventional art, but indicates a detailed status of the image forming device by predetermined codes and the like, it becomes possible to supply detailed statuses of the image forming device to the managing device in response to general-purpose commands output by the managing device, such as SNMP-based commands, as well.

BRIEF DESCRIPTION OF THE DRAWINGS

A preferred embodiment of the present invention will be described in detail with reference to the following figures wherein.

DETAILED DESCRIPTION OF PREFERRED EMBODIMENTS

Figure 1:
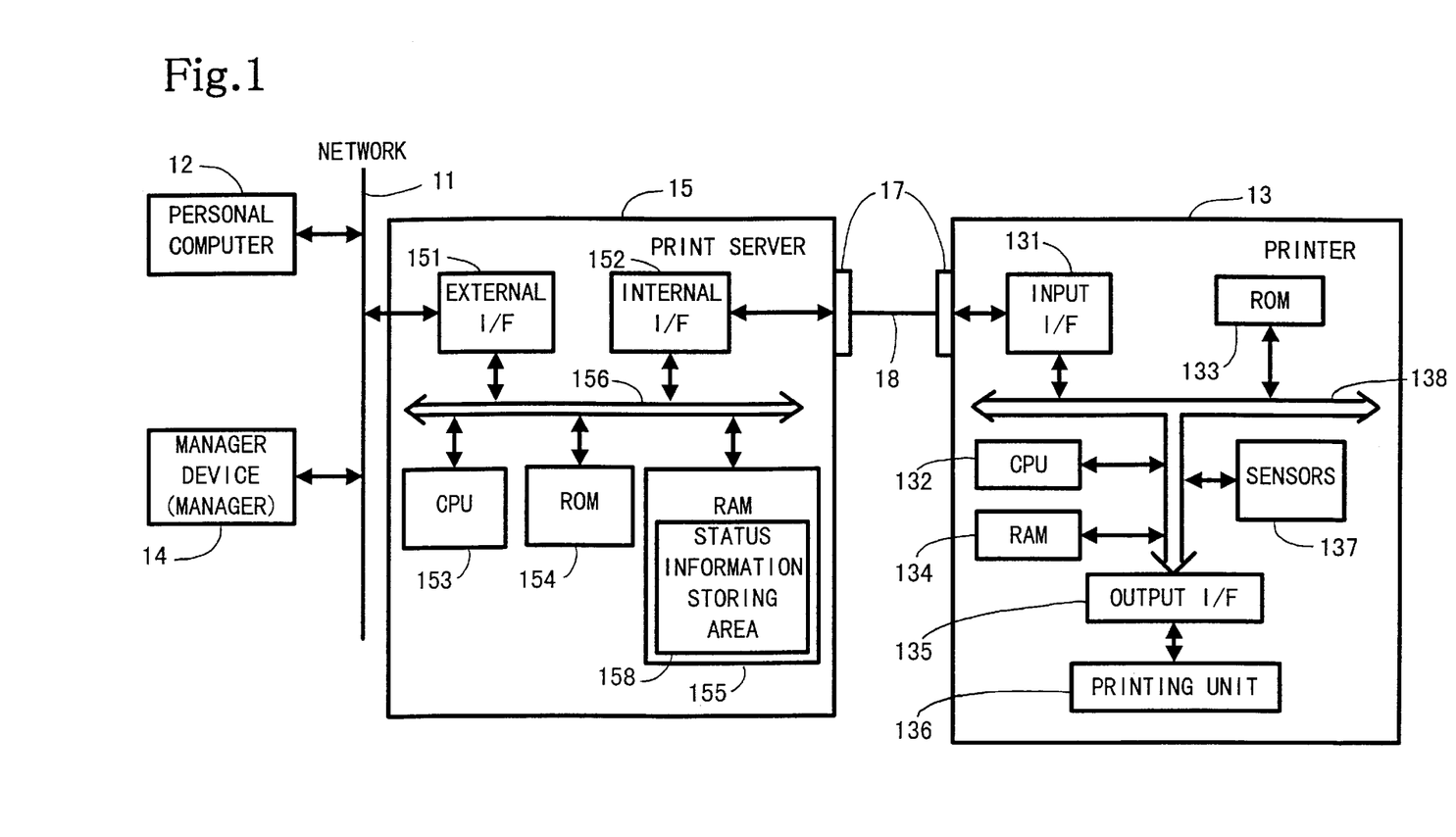
FIG. 1 is a block diagram illustrating a preferred embodiment of the invention.
Figure 3:
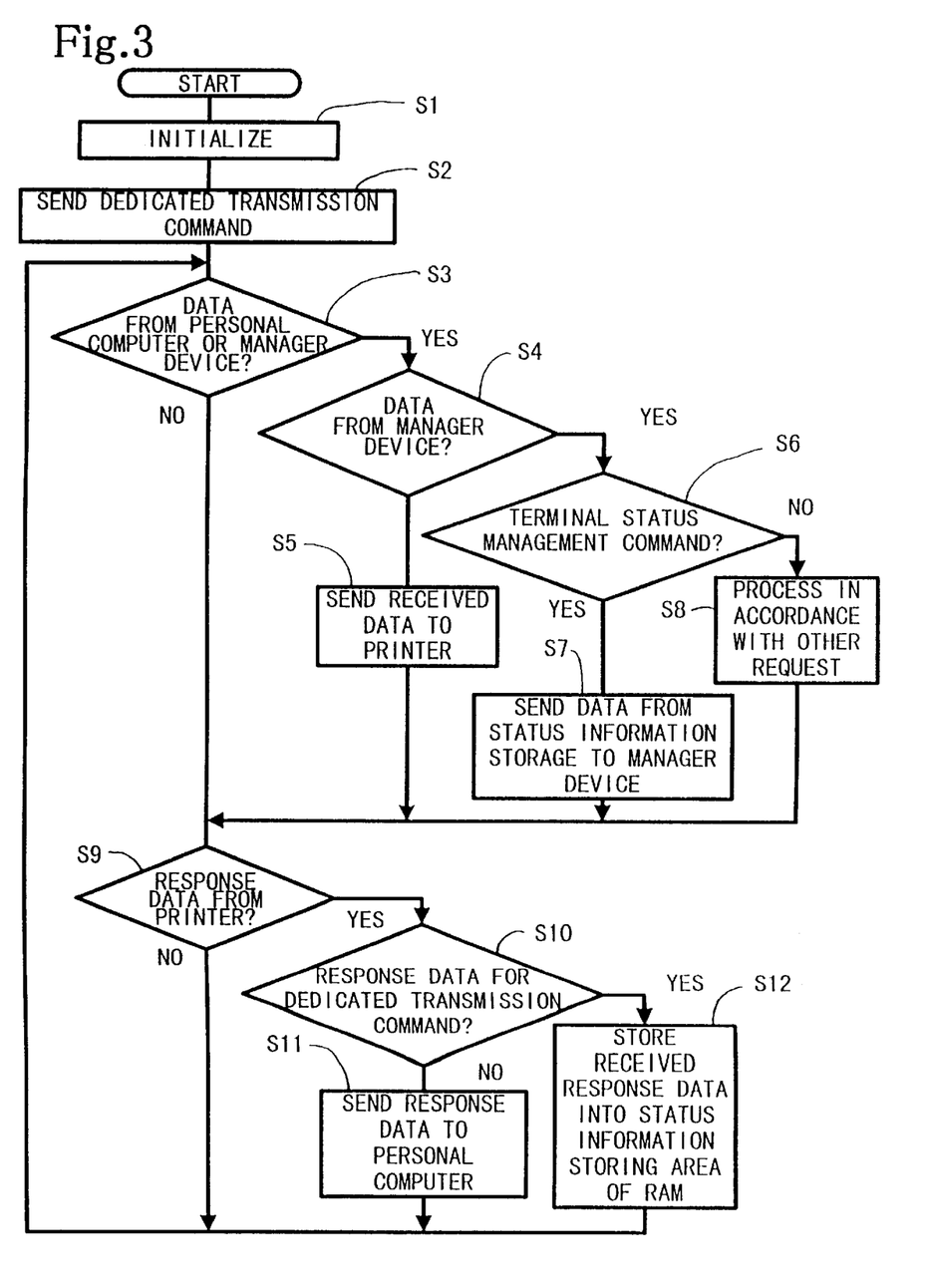
FIG. 3 is a flowchart illustrating an operation performed by the embodiment.
Figure 4:
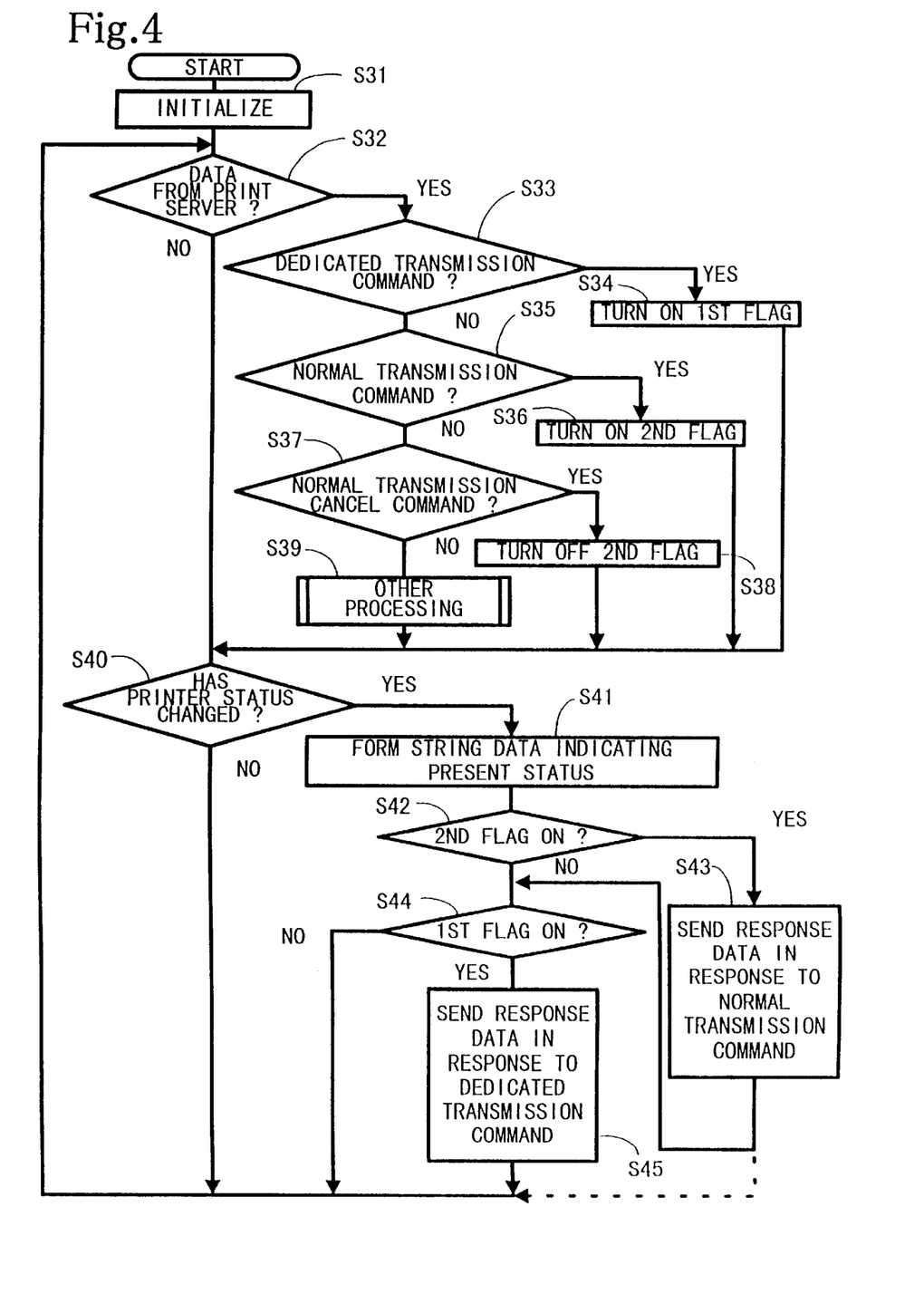
FIG. 4 is a flowchart illustrating another operation performed by the embodiment.

A preferred embodiment of the present invention will be described in detail hereinafter with reference to the FIGS. 1–4. FIG. 1 is a block diagram illustrating the embodiment of the invention. FIGS. 2A–2D illustrate commands and data needed for the operation of the embodiment. FIGS. 3 and 4 are flowcharts illustrating the operation of the embodiment.

Referring first to FIG. 1, a network 11 formed by telephone lines, a LAN and the like is connected to a personal computer 12 and a manager device 14 that manages a printer 13 provided as a terminal device. A print server 15, that is, a network adapter, is provided between the printer 13 and the network 11 for interconnecting the printer 13 and the network 11. The print server 15 enables bidirectional communication between the printer 13 and the personal computer 12 and between the printer 13 and the manager device 14. The print server 15 and the printer 13 are interconnected via connecting lines 18 that are provided with connectors 17 based on the IEEE 1284.

The manager device 14 receives from the print server 15 management information regarding network appliances termed agents, such as the printer 13, and thereby manages the status of the printer 13 according to the simple network management protocol (SNMP).

In order to acquire the status of the printer 13, that is, an agent, a CPU (not shown) provided in the manager device 14 sends a general-purpose terminal status management command based on the SNMP to the print server 15.

The personal computer 12 transmits various data for the processing of the printer 13 by using a protocol such as the line printer remote (LPR) or the like. The data includes a normal transmission command that requests the printer 13 to transmit a response data indicating the present status of the printer 13. The normal transmission command is sent to the printer 13 via the print server 15.

As shown in FIG. 1, the printer 13 has an input interface (I/F) 131 for sending information to and receiving information from the print server 15, a CPU 132, a ROM 133 storing control programs needed for the processings in accordance with various commands, a RAM 134 for temporarily storing data, an output interface (I/F) 135 for outputting print data received from the personal computer 12, a printing unit 136 for forming on a print sheet an image based on the print data from the output interface 135, various sensors 137 for detecting statuses of various portions of the printer 13 and the like and outputting the detected statuses and the like to the CPU 132, and a bus 138.

The CPU 132 receives the normal transmission command from the personal computer 12 and a dedicated transmission command (described below) from the print server 15, via the input interface 131, and identifies the commands. If the CPU 132 determines that the normal transmission command is received from the personal computer 12, the CPU 132 forms response data that indicates the status of the printer 13 corresponding to the command, on the basis of outputs from the sensors 137. Likewise, if the CPU 132 determines that the dedicated transmission command is received from the print server 15, the CPU 132 forms response data that indicates the status of the printer 13 corresponding to the command, on the basis of outputs from the sensors 137. Then, the CPU 132 sends the print server 15 the response data indicating detailed contents on the basis of, for example, predetermined codes provided by the Data0–Data7 signals through the IEEE 1284-compliant connecting lines 18.

The print server 15 has an external interface 151 for sending information to and receiving information from the personal computer 12 and the manager device 14 via the network 11, an internal interface 152 for sending information to and receiving information from the printer 13, a CPU 153, a ROM 154 storing control programs needed for the processings in response to various commands from the manager device 14, a RAM 155 for temporarily storing data, and a bus 156, as shown in FIG. 1. The RAM 155 has a status information storing area 158, that is, a status information storing device, for storing information data contained in the response data transmitted from the printer 13 in response to the dedicated transmission command (described below). The status information storing area 158 stores, as an initial value, information indicating that the terminal device (printer 13) connected to the print server 15 is powered off. This information is pre-stored by the CPU 153.

When the printer 13 is powered on, the CPU 153 senses the powered-on status of the printer 13 by detecting a signal level change in a predetermined signal line of the connecting lines 18, or by detecting data received from the printer 13 via the internal interface 152 after the printer 13 is powered on. Upon sensing the powered-on status of the printer 13, the CPU 153 generates the dedicated transmission command and sends it to the printer 13 to request that if the status of the printer 13 changes, the printer 13 transmits the response data indicating the present status after the change. The operation of sensing the powered-on status of the printer 13 corresponds to or forms a starting device. The operation of generating the dedicated transmission command corresponds to or forms a status request generating device.

The CPU 153 receives, via the internal interface 152, the response data transmitted by the printer 3 in response to the normal transmission command from the personal computer 12 or the dedicated transmission command from the print server 15, and determines whether the received response data corresponds to the normal transmission command or the dedicated transmission command. If the received response data corresponds to the normal transmission command, the CPU 153 immediately sends the response data to the personal computer 12 without performing any particular operation on the data. If the received response data corresponds to the dedicated transmission command, the CPU 153 stores the status data contained in the response data into the status information storing area 158 of the RAM 155. This operation of the CPU 153 corresponds to or forms a determining device.

The CPU 153 also receives various requests based on the SNMP from the manager device 14 via the external interface 151. If the CPU 153 determines that a received request is the general-purpose terminal status management command requesting the present status of the printer 13, the CPU 153 reads the status data from the status information storing area 158 of the RAM 155, and sends the manager device 14 the status data in the form of a packet of a data format based on the SNMP. This operation corresponds to a transmitting device. If receiving a request other than the general-purpose terminal status management command, the CPU 153 executes an operation in accordance with the request.

Therefore, when the printer 13 is powered on for operation, the powered-on status is sensed by the CPU 153 of the print server 15, so that the CPU 153 sends the dedicated transmission command to the printer 13. Once the printer 13 receives the dedicated transmission command after being powered on, the CPU 132 of the printer 13 forms string data indicating the present status every time the status of the printer 13 changes. The string data is sent, as response data in response to the dedicated transmission command, to the print server 15. A portion (a status code indicating the status information, string data, on-line information or the like) of the response data is stored into the status information storing area 158 of the RAM 155 of the print server 15. As a result, the status information storing area 158 always keeps the latest status information regarding the printer 13.

The print server 15 receives processing data, including print data and various command data, which is transmitted from the personal computer 12 by a protocol such as the LPR or the like. The print server 15 immediately sends the received processing data to the printer 13 via the internal interface 152, without performing any particular operation on the data. If the CPU 132 of the printer 13 determines that the received processing data contains the normal transmission command, the CPU 132 forms, in response to the command, string data indicating the present status of the printer 13 on the basis of the present statuses of the printer 13 detected by the sensors 137 (or selects an appropriate piece from the string data pre-stored in the ROM 133).

The CPU 132 of the printer 13 forms the string data in the format of response data corresponding to the normal transmission command by adding a status code that indicates the present status of the printer 13 in the form of a code, and then sends the response data to the print server 15. Upon receiving the response data, the print server 15 arranges the response data in the form of packets conforming to a predetermined protocol for the communication with the personal computer 12, and immediately sends the response data to the personal computer 12 via the network 11. As stated above, once the printer 13 has received the normal transmission command, the printer 13 forms response data indicating the present status every time the status of the printer 13 changes. The thus-formed response data is immediately sent to the print server 15 whereby the data is transmitted to the personal computer 12.

The normal transmission command from the personal computer 12, the dedicated transmission command from the print server 15, and the response data transmitted by the printer 13 in response to the normal transmission command and the dedicated transmission command are formed, for example, as shown in FIGS. 2A–2D.

Figure 2A:
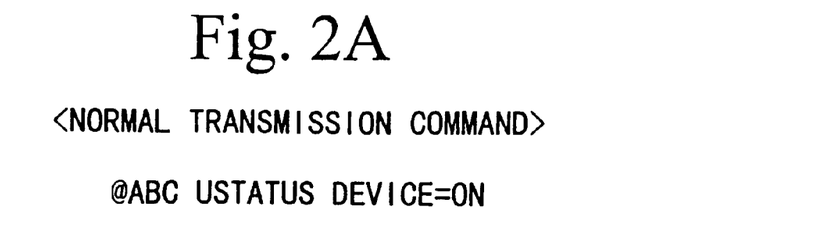
FIGS. 2A–2D illustrate commands and data used in the operation of the embodiment.
Figure 2B:
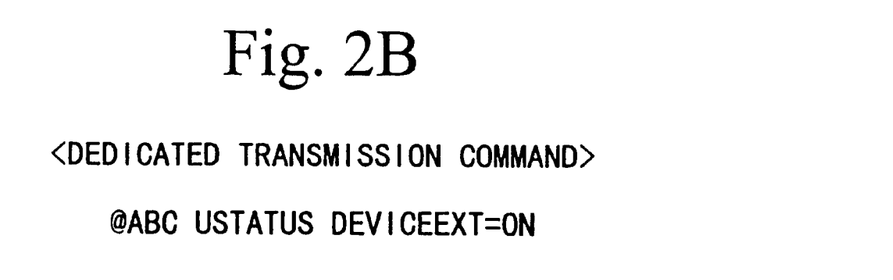
Figure 2C:
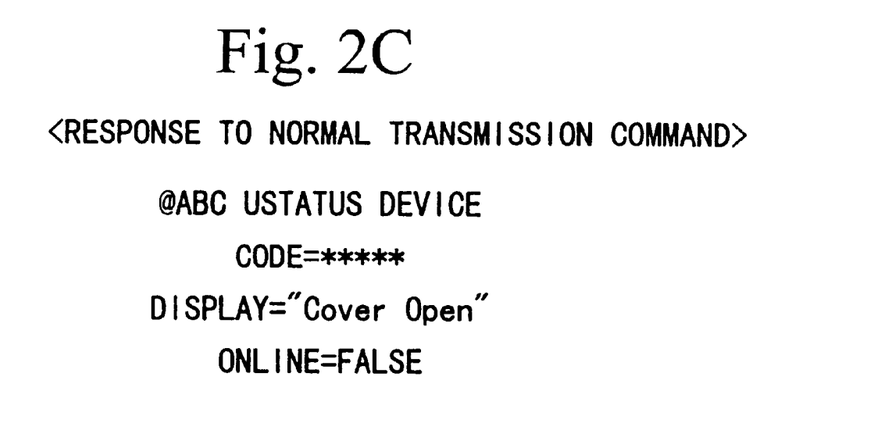
Figure 2D:
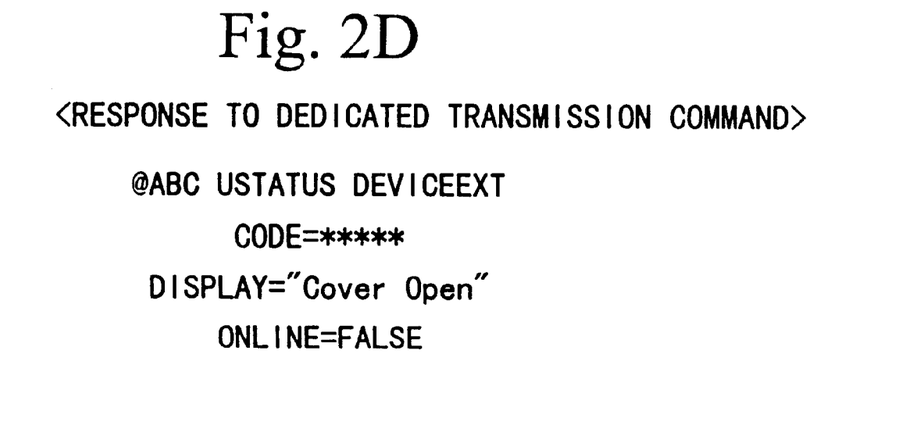

In the response data shown in FIGS. 2C and 2D, @ABC and the following portion of response data, shown on the first line in each figures, constitute a command portion corresponding to the command shown in FIGS. 2A or 2B. A portion of the response data shown on the second line in each of FIGS. 2C and 2D is a status code portion that indicates the present status in the form of a predetermined code. A portion of the response data shown on the third line in each figure indicates the present status of the printer 13 to the display device of the personal computer 12 in the form of a character sequence (string data sandwiched by " "). A portion of the response data shown on the fourth line in each figure carries information (on-line information) that indicates the present status of a data receiving port. The on-line information indicates "FALSE" when reception is impossible, and "TRUE" when reception is possible. As can be seen from FIGS. 2A–2D, the dedicated transmission command can be formed by adding EXT to the normal transmission command, and the response data in response to the dedicated transmission command can be formed by adding EXT to the response data in response to the normal transmission command.

Therefore, upon receiving the normal transmission command or the dedicated transmission command, the CPU 132 of the printer 13 determines whether the received transmission command is the normal transmission command or the dedicated transmission command on the basis of whether EXT is contained in the transmission command. If it is determined that the received transmission command is the dedicated transmission command, the CPU 132 sends the response data formed by adding EXT to the response data corresponding to the normal transmission command, to the print server 15.

Upon receiving the response data from the printer 13, the CPU 153 of the print server 15 determines whether the received response data is a response to the normal transmission command or a response to the dedicated transmission command on the basis of whether the response data contains EXT. If the received response data does not contain EXT, the CPU 153 determines that the received response data corresponds to the normal transmission command, and immediately transfers the response data to the personal computer 12 without performing any particular operation on the response data. If the received response data contains EXT, the CPU 153 determines that the response data corresponds to the dedicated transmission command, and stores the status data contained in the response data into the RAM 155.

The commands issued by the personal computer 12 include not only the aforementioned normal transmission command but also a normal transmission cancel command that cancels the response by the printer 13. The normal transmission cancel command can be formed by replacing ON in the normal transmission command shown in FIG. 2A with OFF. Use of the two commands makes it possible to monitor a status change in the printer 13 on the personal computer 12 for a necessary period of time.

In contrast, the commands issued by the CPU 153 of the print server 15 do not include a command for canceling the response by the printer 13. Therefore, once the dedicated transmission command is transmitted to the printer 13 immediately after the printer 13 is turned on, the printer 13 continues to send the response data to the print server 15 in response to the dedicated transmission command until the printer 13 is powered off.

The operation sequences of the CPU 153 of the print server 15 and the CPU 132 of the printer 13 will be described below.

The operation sequence of the CPU 153 of the print server 15 will first be described with reference to the flowchart of FIG. 3. When the printer 13 is powered on, the CPU 153 senses the powered-on status of the printer 13 by detecting a signal level change in the signal line of the connecting lines 18. Then, in step S1, the CPU 153 executes initialization, for example, stores information indicating that the initialization is being performed, into the status information storing area 158 of the RAM 155. Subsequently in step S2, the CPU 153 generates the dedicated transmission command and sends it to the printer 13.

In step S3, the CPU 153 determines whether there is data received from the personal computer 12 or the manager device 14. If the determination is affirmative, the CPU 153 determines in step S4 whether the data is from the manager device 14. For example, if the received data is based on the SNMP, the CPU 153 determines that the data is from the manager device 14. If the received data is based on a protocol other than the SNMP, for example, a protocol normally used for data transmission, such as the LPR or the like, the CPU 153 determines that the data is from the personal computer 12.

If the determination in step S4 is negative, it is considered that the received data is data from personal computer 12 which needs processing by the printer 13, for example, the normal transmission command. Therefore, in step S5, the CPU 153 removes unnecessary data in the packet, for example, data dependent on the transmission protocol, and transmits the remaining data to the printer 13.

Conversely, if the determination in step S4 is affirmative, the CPU 153 determines in step S6 whether the data received from the manager device 14 is the terminal status management command. If the determination is affirmative, the CPU 153 reads the status data from the status information storing area 158 of the RAM 155, and sends the status data in the form of a packet conforming to the SNMP, to the manager device 14 in step S7. If the determination in step S6 is negative, that is, if the data from the manager device 14 is not the terminal status management command, the CPU 153 executes processing in accordance with the request from the manager device 14 in step S8.

If it is determined in step S3 that there is no data received from the personal computer 12 or the manager device 14, the operation proceeds to step S9, which also follows steps steps S5, S7 and S8. In step S9, the CPU 153 determines whether there is response data from the printer 13. If the determination is negative, the operation returns to step S3. If the determination is affirmative, the operation proceeds to step S10, where the CPU 153 determines whether the received data has been output in response to the dedicated transmission command.

If the determination in step S10 is negative, it is considered that the response data from the printer 13 is not the response data in response to the dedicated transmission command, but that it is the response data in response to the normal transmission command from the personal computer 12 or the response data in response to a request from the manager device 14 other than the terminal status management command. Therefore, in step S11, the CPU 153 arranges the received data into a packet conforming to the protocol used for the transmission to the personal computer 12, and then sends it out to the network 11. The operation then returns to step S3. If the determination in step S10 is affirmative, that is, if it is determined that the data from the printer 13 is the response data in response to the dedicated transmission command, the CPU 153 stores the status data contained in the response data from the printer 13, into the status information storing area 158 of the RAM 155 in step S12. The operation then returns to step S3.

Although in the flowchart of FIG. 3, the operation of storing the status data contained in the response data in step S12 is performed following the affirmative determination in step S10, the storing operation may instead be performed after the affirmative determination in step S9, so that the latest status information from the printer 13 will be entirely stored into the status information storing area 158 of the RAM 155. In this case, however, the determination in step S10 is changed to a determination as to whether the data from the printer 13 is data to be returned to either the personal computer 12 or the manager device 14. If the determination in step S10 is affirmative, the operation proceeds to step S11. If the determination in step S10 is negative, the operation immediately returns to step S3.

The operation sequence of the CPU 132 of the printer 13 will now be described with reference to the flowchart of FIG. 4.

When the printer 13 is powered on, the CPU 132 of the printer 13 performs initialization, for example, turns off various flags, and sets the signal level in the connecting lines 18 connected to the input interface 131 to an initial signal level in step S31. In this step S31, it is also possible to transmit from the input interface 131 a command indicating that the printer 13 has been powered on.

Subsequently in step 32, the CPU 132 determines whether there is data received from the print server 15. If the determination is affirmative, the CPU 132 determines in step S33 whether the received data is the dedicated transmission command. If determination is affirmative, the CPU 132 turns on a first flag in step S34. If the determination in step S33 is negative, the CPU 132 determines in step S35 whether the data received from the print server 15 is the normal transmission command output by the personal computer 12. If the determination is affirmative, the CPU 132 turns on a second flag in step S36.

If the determination in step S35 is negative, the CPU 132 determines in step S37 whether the data received from the print server 15 is the normal transmission cancel command. If the determination in step 37 is affirmative, the CPU 132 turns off the second flag in step S38. If the determination in step 37 is negative, the CPU 132 performs other processing including the printing or the like in step 39. Subsequently, the operation proceeds to step S40, which also follows steps steps S36, S36 and S38.

In step S40, the CPU 132 determines whether the status of the printer 13 has changed. If the determination is negative, the operation returns to step S32. If the determination is affirmative, the operation proceeds to step S41, where the CPU 132 forms string data, for example, "COVER OPEN" as shown in FIGS. 2C and 2D, and combines it with other information including the status code and the on-line information to form response data.

Subsequently in step S42, the CPU 132 determines whether the second flag is on. If the determination is affirmative, it is considered that the normal transmission command from the personal computer 12 has been received. Therefore, in step S43, the CPU 132 sends the response data in response to the normal transmission command to the print server 15. Then the operation proceeds to step S44.

If the determination in step S42 is negative, the CPU 132 determines in step S44 whether the first flag is on. If the determination in step 44 is affirmative, it is considered that the dedicated transmission command from the print server 15 has been received. Therefore, in step S45, the CPU 132 sends the response data in response to the dedicated transmission command to the print server 15. Then the operation returns to step S32. Conversely, if the determination in step S44 is negative, the operation immediately returns to step S32.

The latest status of the printer 13 may instead be entirely stored into the status information storing area 158 of the RAM 155 regardless of whether the transmission command is the dedicated transmission command or the normal transmission command, as stated above in the description of the flowchart of FIG. 3. If this processing is adopted, the processing in step S44 and step S45 can be omitted as indicated by a broken line in FIG. 4.

In this embodiment, the dedicated transmission command is generated by the CPU 153 of the print server 15 separately from the normal transmission command issued by the personal computer 12, and the dedicated transmission command is transmitted to the printer 13 when the printer 13 is powered on. Therefore, every time the status of the printer 13 changes, the printer 13 sends the print server 15 response data indicating the detailed present status of the printer 13, in such a manner as to respond to the dedicated transmission command received at the time of power-on of the printer 13.

Upon receiving the response data from the printer 13, the CPU 153 of the print server 15 determines whether the response data corresponds to the dedicated transmission command or the normal transmission command from the personal computer 12. If it is determined that the response data corresponds to the dedicated transmission command, the CPU 153 stores the status data provided by the received response data into the status information storing area 158 of the RAM 155.

Upon receiving from the manager device 14 the SNMP-based general-purpose terminal status management command for managing the status of the printer 13, the CPU 153 of the print server 15 responds to the terminal status management command, reads the status data from the status information storing area 158 of the RAM 155, arranges the read status data into data in a form based on the SNM, and sends the data to the manager device 14.

The status data stored in the status information storing area 158 of the print server 15 does not merely indicate the status of the printer 13 by a combination of particular levels of signals such as the Busy signal, the PE signal and the like, but indicates detailed statuses of the printer 13 by predetermined codes based on the Data0–Data7 signals. Therefore, the manager device 14 can detect the latest status of the printer 13 after the printer 13 is powered on, simply by sending the general-purpose terminal status management command based on the SNMP to the print server 15 when necessary.

In the embodiment, the print server 15 sends the dedicated transmission command to the printer 13 immediately after the printer 13 is powered on, so that every time the status of the printer 13 changes, the status data indicating the present or latest status of the printer 13 is stored into the status information storing area 158 of the RAM 155. When the general-purpose terminal status management command is issued by the manager device 14, the status data is read from the status information storing area 158 of the RAM 155 and then transmitted to the manager device 14. Consequently, various status information regarding the printer 13 can be supplied to the manager device 14.

The print server 15 does not need to store all the status data from the printer 13, but needs only to store the status data in such a manner that various statuses of the printer 13 can be identified. For example, the string data contained in the response data sent to the print server 15 from the printer 13 in response to the dedicated transmission command may be stored into the status information storing area 158 of the RAM 155, and the status of the printer 13 based on the string data may be transmitted to the manager device 14. It is also possible to store only the status code and send the manager device 14 an SNMP-based data sequence selected on the basis of the stored status data from SNMP-based data sequences that have been stored in the ROM 154 and that indicate statuses corresponding to status codes.

Although in the foregoing embodiment, the printer 13 transmits response data corresponding to the two transmission commands, that is, the normal transmission command output by the personal computer 12 and the dedicated transmission command output by the CPU 153 of the print server 15, it is also possible to adopt a construction in which only one type of transmission command is sent to the printer 13 from the personal computer 12 and the CPU 153 of the print server 15. Then, all the response data transmitted from the printer 13 in response to the transmission command is stored into the status information storing area 158 of the RAM 155 of the print server 15.

If this construction is adopted, a flag in the RAM 155 is turned on when the print server 15 receives the transmission command from the personal computer 12, so that it can be indicated that the transmission command has been received from the personal computer 12. When the response data in response to the transmission command is received from the personal computer 12, the print server 15 stores the response data into the status information storing area 158 on the basis of the status of the flag in the RAM 155, and also transmits the response data to the personal computer 12. This construction eliminates the need for the printer 13 to identify the transmission command, so that the printer 13 may be a conventional type that is able to respond only to the normal transmission command.

Although in the foregoing embodiment, the terminal device is the printer 13, the terminal device is not limited to a printer but may also be an image forming device, other than a printer, or other terminal devices that are controlled and managed by a computer.

Although in the foregoing embodiment, the network adapter is the print server 15, the network adapter is not limited to a print server. The invention can be applied so as to achieve substantially the same advantages as achieved by the embodiment, as long as a network adapter is provided between a network and a terminal device, interconnects the network and the terminal device, and enables bidirectional communication between the terminal device and a computer or the like that is connected to the network.

Although the foregoing embodiment employs an IEEE 1284-based interface for transmitting and receiving status information by using a general-purpose port, the interface may be of other type. That is, the invention can also be embodied in a similar manner so as to achieve substantially the same advantages as achieved by the embodiment, if the interface is an interface that does not allow a special or dedicated port to be set but must use a general-purpose port to transmit and receive status information, for example, a parallel interface other than the IEEE 1284 interface, or a serial interface such as RS-232C or the like, a small computer system interface (SCSI), or the like.

The invention is also applicable to a case where a network adapter and a terminal device form a terminal system as in the print server 15 and the printer 13, and the terminal system is connected to a network for bidirectional communication with a computer. In this case, too, substantially the same advantages as described above can be achieved.

It is to be understood that the invention is not restricted to the particular forms shown in the foregoing embodiment. Various modifications and alternations can be made thereto without departing from the scope of the invention.

As understood from the above description, the status request generating device provided in the network adapter of the invention generates a status request separately from a status request output by the computer, and transmits it to the terminal device. Therefore, every time the status of the terminal device changes, the status information indicating the present status of the terminal device is stored into the status information storage device, so that the status information can be output from the storage device to the managing device in response to the terminal status management command from the managing device. Thus, the network adapter of the invention is able to supply various statuses of the terminal device to the managing device.

Furthermore, in the network adapter of the invention, the terminal device can determine whether the received status request is from the computer or from the status request generating device, and therefore can transmit the status information in response to the status request in such a manner that it can be clearly determined which of the status requests the status information corresponds to. Consequently, it becomes possible for the determining device of the network adapter to easily determine whether the status information received by the determining device corresponds to the status request output by the computer or the status request output by the status request generating device.

Further, in the network adapter, when the terminal device is powered on, the starting device starts the status request generating device so as to output the status request to the terminal device. Therefore, the network adapter becomes able to supply various statuses of the terminal device immediately after the terminal device is powered on to start operating on the network.

Still further, in the network adapter, once the status request generating device has transmitted the status request to an image forming device, that is, a terminal device, the network adapter can receive the status information indicating the present status of the image forming device by using a general-purpose data port every time the status of the image forming device changes. Therefore, the network adapter is able to supply status information indicating various statuses of the image forming device to the managing device.

In the terminal system of the invention, when the managing device transmits to the network adapter the terminal status management command to manage the status of the terminal device, the network adapter reads from the status information storage device the status information that has been received from the terminal device and stored into the storage device in response to the status request. Therefore, it becomes possible to supply various statuses of the terminal device to the managing device.

Furthermore, in the terminal system, the terminal device is able to transmit the status information in such a manner that it can be clearly determined whether the status information corresponds to the status request from the computer or the status request from the status request generating device. Consequently, the determination regarding the status information by the determining device of the network adapter is facilitated.

Further, in the terminal system, when the terminal device is powered on, the starting device starts the status request generating device so as to output the status request to the terminal device. Therefore, the terminal system becomes able to supply various statuses of the terminal device immediately after the terminal device is powered on to start operating on the network.

Further, in the terminal system, once the status request generating device has transmitted the status request to an image forming device, that is, a terminal device, the network adapter can receive the status information indicating the present status of the image forming device by using a general-purpose data port every time the status of the image forming device changes. Therefore, the terminal system is able to supply status information indicating various statuses of the image forming device to the managing device.

What is claimed is:

1. A network adapter that interconnects a network and a terminal device, and enables bidirectional communication between the terminal device and a computer connected to the network and bidirectional communication between the terminal device and a managing device connected to the network to manage the terminal device, the network adapter transferring to the terminal device a status request output by the computer to request that if the terminal device enters a predetermined status, the terminal device will transmit status information indicating the predetermined status, and the network adapter transferring the status information transmitted by the terminal device in response to the status request, to the computer, the network adapter comprising:

a status request generating device that generates a status request to request that if the status of the terminal device changes, the terminal device will transmit the status information indicating a present status, the status request generating device transmitting the status request to the terminal device;

a status information storage device that stores the status information from the terminal device;

a determining device that receives the status information transmitted by the terminal device in response to the status request, determines whether the status information received is a response to the status request output by the computer or a response to the status request transmitted by the status request generating device, transmits the status information to the computer if the status information is the response to the status request output by the computer, and transmits the status information to the status information storage device if the status information is the response to the status request transmitted by the status request generating device; and a transmitting device that receives a terminal status management command output by the managing device to manage the status of the terminal device, reads the status information from the status information storage device, and transmits the status information to the managing device.

2. The network adapter according to claim 1, wherein the terminal device is an image forming device that forms an image based on image data, and the network adapter receives the status information indicating a status of the image forming device from the image forming device, by using a general-purpose data port.

3. The network adapter according to claim 1, further comprising a starting device that, when the terminal device is powered on, starts the status request generating device so as to generate the status request.

4. The network adapter according to claim 3, wherein the terminal device is an image forming device that forms an image based on image data, and the network adapter receives the status information indicating a status of the image forming device from the image forming device, by using a general-purpose data port.

5. The network adapter according to claim 1, wherein the status information generated by the status request generating device is distinguishable by the terminal device from the status request output by the computer.

6. The network adapter according to claim 5, wherein the terminal device is an image forming device that forms an image based on image data, and the network adapter receives the status information indicating a status of the image forming device from the image forming device, by using a general-purpose data port.

7. The network adapter according to claim 5, further comprising a starting device that, when the terminal device is powered on, starts the status request generating device so as to generate the status request.

8. The network adapter according to claim 7, wherein the terminal device is an image forming device that forms an image based on image data, and the network adapter receives the status information indicating a status of the image forming device from the image forming device, by using a general-purpose data port.

9. A terminal system, comprising:
   the network adapter of claim 1; and
   a terminal device connected to the network adapter.

10. The terminal system according to claim 9, wherein the terminal device is an image forming device that forms an image based on image data, and the network adapter receives the status information indicating a status of the image forming device from the image forming device, by using a general-purpose data port.

11. The terminal system according to claim 9, further comprising a starting device that, when the terminal device is powered on, starts the status request generating device so as to generate the status request.

12. The network adapter according to claim 9, wherein the status information generated by the status request generating device is distinguishable by the terminal device from the status request output by the computer.

13. A method of interconnecting a network and a terminal device to enable bidirectional communication between the terminal device and a computer connected to the network and bidirectional communication between the terminal device and a managing device connected to the network to manage the terminal device, transferring to the terminal device a status request output by the computer to request that if the terminal device enters a predetermined status, the terminal device will transmit status information indicating the predetermined status, and transferring the status information transmitted by the terminal device in response to the status request, to the computer, the method comprising:
   generating a status request to request that if the status of the terminal device changes, the terminal device will transmit the status information indicating a present status, and transmitting the status request to the terminal device;
   storing the status information from the terminal device in a status information storage device;
   receiving the status information transmitted by the terminal device in response to the status request, and determining whether the status information received is a response to the status request output by the computer or a response to the status request transmitted by the generating step;
   transmitting the status information to the computer if the status information is the response to the status request output by the computer, and transmitting the status information to the status information storage device if the status information is the response to the status request transmitted by the generating step; and
   receiving a terminal status management command output by the managing device to manage the status of the terminal device, reading the status information from the status information storage device, and transmitting the status information to the managing device.

14. The method according to claim 13, wherein the terminal device is an image forming device that forms an image based on image data, and the status information receives an indication of a status of the image forming device from the image forming device, by using a general-purpose data port.

15. The method according to claim 13, further comprising starting the generation of the status request when the terminal device is powered on.

16. The method according to claim 13, wherein the status information generated by the generating step is distinguishable by the terminal device from the status request output by the computer.

17. A storage medium for storing programs to interconnect a network and a terminal device to enable bidirectional communication between the terminal device and a computer connected to the network and bidirectional communication between the terminal device and a managing device connected to the network to manage the terminal device, transfer to the terminal device a status request output by the computer to request that if the terminal device enters a predetermined status, the terminal device will transmit status information indicating the predetermined status, and transfer the status information transmitted by the terminal device in response to the status request, to the computer, the storage medium comprising:
   a program to generate a status request to request that if the status of the terminal device changes, the terminal device will transmit the status information indicating a present status, and transmit the status request to the terminal device;
   a program to store the status information from the terminal device in a status information storage device;
   a program to receive the status information transmitted by the terminal device in response to the status request, and determine whether the status information received is a response to the status request output by the computer or a response to the status request transmitted by the generating step;
   a program to transmit the status information to the computer if the status information is the response to the status request output by the computer, and transmit the status information to the status information storage device if the status information is the response to the status request transmitted by the program to generate; and
   a program to receive a terminal status management command output by the managing device to manage the status of the terminal device, read the status information from the status information storage device, and transmit the status information to the managing device.

18. The storage medium according to claim 17, wherein the terminal device is an image forming device that forms an image based on image data, and the status information receives an indication of a status of the image forming device from the image forming device, by using a general-purpose data port.

19. The storage medium according to claim 17, further comprising a program to start the generation of the status request when the terminal device is powered on.

20. The storage medium according to claim 17, wherein the status information generated by the program to generate is distinguishable by the terminal device from the status request output by the computer.

* * * * *